United States Patent [19]

Suzuki et al.

[11] Patent Number: 4,517,247
[45] Date of Patent: May 14, 1985

[54] FLUORORESIN FORMED BODY AND METHOD FOR PRODUCING THE SAME

[75] Inventors: Hirosuke Suzuki, Tokorozawa; Yoshiaki Sato, Hitaka, both of Japan

[73] Assignee: Junkosha Co., Ltd., Tokyo, Japan

[21] Appl. No.: 483,685

[22] Filed: Apr. 11, 1983

[30] Foreign Application Priority Data

May 21, 1982 [JP] Japan .................................. 57-86762

[51] Int. Cl.$^3$ ......................... B32B 27/30; B32B 1/10
[52] U.S. Cl. .................................. 428/421; 264/127; 264/221; 264/259; 264/265; 264/317; 264/331.14; 264/268; 428/422; 428/68; 428/76
[58] Field of Search .................. 428/422, 421, 68, 76; 264/127, 265, 221, 317, 331.14, 268, 239

[56] References Cited

U.S. PATENT DOCUMENTS

| | | | |
|---|---|---|---|
| 3,205,113 | 9/1965 | McFarland | 264/127 |
| 3,352,714 | 11/1967 | Anderson | 428/422 |
| 3,420,729 | 1/1969 | Roberts | 428/35 |
| 3,537,700 | 11/1970 | Schenck | 264/127 |
| 3,967,018 | 6/1976 | Jansta | 428/422 |
| 3,967,042 | 6/1976 | Laskin | 428/422 |
| 4,215,177 | 7/1980 | Strassel | 428/421 |
| 4,291,463 | 9/1981 | Williams | 428/422 |

FOREIGN PATENT DOCUMENTS

| | | | |
|---|---|---|---|
| 2230404 | 2/1973 | Fed. Rep. of Germany | 428/422 |
| 0014637 | 2/1977 | Japan | 428/422 |

Primary Examiner—Ellis P. Robinson
Attorney, Agent, or Firm—Mortenson & Uebler

[57] ABSTRACT

A shaped article having a synthetic resinous body and a thin fluoropolymer weld layer on its surface is formed by a process which comprises heating a heat conductive metallic core member, forming a thin fluoropolymer weld layer on the surface of the core member, treating the exposed surface of the fluoropolymer layer, forming a synthetic resinous body on the outer, treated surface of the fluoropolymer layer and removing the core member, such as by dissolving. In the shaped article thus produced, a thin fluoropolymer weld layer is formed on the surface of the synthetic resinous body, and the thickness of the fluoropolymer coating can be reduced. This permits the production of shaped articles at low cost and having high mechanical strength, even for complicated shapes. According to the invention, it is possible to produce articles having complex shapes such as corrosion resistant vessels, molds having good release characteristics, and so forth, at a comparatively low cost.

6 Claims, 4 Drawing Figures

4,517,247

FLUORORESIN FORMED BODY AND METHOD FOR PRODUCING THE SAME

BACKGROUND OF THE INVENTION

The present invention relates to a fluoropolymer-coated formed member and a method of producing the same.

Generally, fluoropolymers exhibit superior corrosion resistance, as well as good lubricating and release characteristics and, therefore, are finding wide use as the material of formed members such as vessels, molds and so forth. Hitherto, fluoropolymer formed bodies have been produced by extrusion, including injection molding or by means of molds, so that fluoropolymer formed members inevitably had large wall thickness and fluoropolymers were applied even to the portions of the formed bodies which do not require the presence of the fluoropolymer, resulting in elevated cost of production.

Under these circumstances, the present invention aims as its primary objective at providing a comparatively less expensive fluoropolymer-coated body, thereby to overcome the above-described problem of the prior art.

SUMMARY OF THE INVENTION

A method is provided for producing a fluoropolymer-coated shaped article comprising heating a heat-conductive mold having a thin layer of fluoropolymer resin thereon to a temperature above the melting point of the resin to form a thin fluoropolymer weld layer on the mold, treating the external surface of the weld layer to enhance its bondability to form-maintaining synthetic resin, forming a form-maintaining synthetic resin integrally on the treated surface of the fluoropolymer weld layer, and removing the heat-conductive mold. The removal of the mold can be by dissolving. Preferably, the mold is made of aluminum. Also provided is a shaped article comprising a synthetic resinous body and a thin fluoropolymer weld layer formed on the surface of the synthetic resinous body.

DETAILED DESCRIPTION OF THE INVENTION AND PREFERRED EMBODIMENTS WITH REFERENCE TO THE DRAWINGS

A shaped article having a synthetic resinous body and a thin fluoropolymer weld layer on its surface is formed by a process which comprises heating a heat-conductive metallic core member, forming a thin fluoropolymer weld layer on the surface of the core member, treating the exposed surface of the fluoropolymer layer, forming a synthetic resinous body on the outer, treated surface of the fluoropolymer layer and removing the core member, such as by dissolving. In the shaped article thus produced, a thin fluoropolymer weld layer is formed on the surface of the synthetic resinous body, and the thickness of the fluoropolymer coating can be reduced. This permits the production of shaped articles at low cost and having high mechanical strength, even for complicated shapes. According to the invention, it is possible to produce articles having complex shapes such as corrosion resistant vessels, molds having good release characteristics, and so forth, at a comparatively low cost.

The invention is best described in detail through specific embodiments shown in the accompanying drawings.

Figure 1:
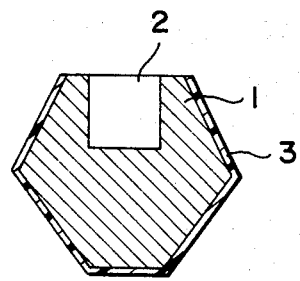
FIG. 1 is a vertical sectional view of a core member coated with a fluoropolymer used in the present invention.
Figure 2:
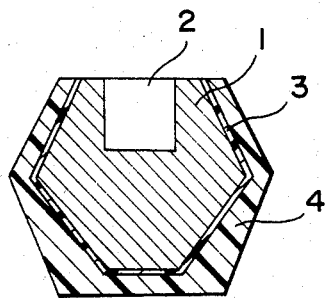
FIG. 2 is a vertical sectional view of a fluoropolymer formed body of the invention in which a synthetic resinous body is formed around the core member having a thin fluoropolymer weld layer formed therebetween.

FIGS. 1 and 2 show an embodiment of the invention applied to the production of a fluoropolymer-coated formed body. Referring to FIG. 1, a core member 1 is shown, made of, for example, aluminum. Core member 1 is provided at the upper end of its central portion thereof with recess 2. Any heat conductive material can be used as the material of the core member 1. For instance, it is possible to use, besides the aluminum, other metals such as aluminum alloys, copper, copper alloys, or the like, and even a conductive, flexible resin such as polytetrafluoroethylene containing carbon.

Heat conductive core member 1 is suitably heated to a temperature at which a coating resin can be molten and then the thin fluoropolymer weld layer 3 is formed on the surface of the core member at a thickness of, for example, 0.3 mm. The formation of this thin fluoropolymer weld layer 3 can be by electrostatic coating, fluid dip coating, powder coating and other suitable coating methods, using powder of polymeric materials such as tetrafluoroethylene-hexafluoropropylene copolymer resin, tetrafluoroethylene-perfluoroalkyl vinyl ether copolymer resin, vinylidene bifluoride resin and so forth. It is also possible to form the layer of fluoropolymer resin such as polytetrafluoroethylene by another method. The layer of fluoropolymer may be formed by attaching the resin to core member 1 at room temperature and then heating the core member to a temperature at which the resin is molten.

Following attachment of the fluoropolymer resin layer to the core, the outer peripheral surface of the thin fluoropolymer layer 3 is treated by sodium treatment, corona-discharge treatment, sputtering or like methods, so as to create a condition which facilitates the bonding of other resins to the thin fluoropolymer weld layer. Thereafter, a form-maintaining synthetic resinous body 4 is formed on the treated outer peripheral surface of the thin fluoride resin weld layer 3. Epoxy resins, various synthetic rubbers and the like materials can be used as the synthetic resin 4.

If the synthetic resin 4 is flexible, the core member 1 can be separated and removed by flexing the synthetic resinous body 4 after the formation of the latter, so that a corrosion resistant synthetic resinous vessel having an inner peripheral fluoropolymeric layer is obtained. When the synthetic resinous body is solid, a dissolving liquid such as sodium hydroxide, aqua regia or the like is poured into recess 2 of core member 1 to melt the core member made of aluminum and a similar corrosion resistant vessel is obtained. In this case, the thin fluoropolymer weld layer is not dissolved because it has a sufficient resistance to attack by such chemicals.

Figure 3:
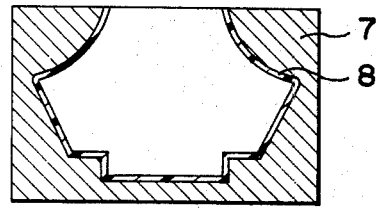
FIG. 3 is a vertical sectional view of a core member and coating of a different embodiment of the invention.
Figure 4:
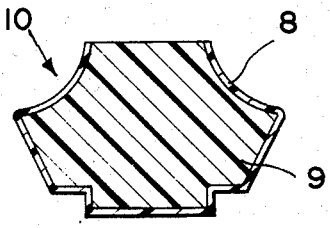
FIG. 4 is a fluoropolymer-coated formed body being a male mold part produced with the core member shown in FIG. 3.

FIGS. 3 and 4 show another embodiment of the invention applied to the production of a male mold part having an outer surface of a fluoropolymer. Referring to FIG. 3, a thin fluoropolymer weld layer 8 is formed on the inside surface of the hollow of core member 7 made of aluminum, in the same manner as that employed in the preceding embodiment.

Then the surface of the thin fluoropolymer weld layer 8 is treated by sodium treatment, corona discharge and so forth, following which a form-maintaining molten, synthetic resin 9 is poured into the hollow and allowed to harden.

Then the core member 7 provided with the synthetic resinous body 9 is immersed in a solution of sodium hydroxide to melt and remove the external core member 7. By so doing, it is possible to obtain a male mold part 10 coated with a fluoropolymer layer as shown in FIG. 4. In this case, a material having a high resistance to sodium hydroxide, such as an epoxy resin reinforced with glass fibers, is used as the material of the synthetic resinous body 9.

As has been described, according to the invention, a fluoropolymer-coated formed body having a synthetic resinous body and a thin fluoropolymer weld layer formed on the surface of the synthetic resinous body can be produced by a process which comprises the steps of heating a heat conductive core member, forming a thin fluoropolymer weld layer on the surface of the core member, treating the surface of the thin fluoropolymer weld layer, forming a form-maintaining, synthetic resinous body integrally on the outer side of the thin fluoropolymer weld layer, and then removing the heat conductive core member. In consequence, a thin fluoropolymer weld layer is formed on the surface of the form-maintaining synthetic resinous body which permits the reduction of thickness of the fluororesin which is generally expensive. It is, therefore, possible to produce the desired formed body at a relatively low cost, and the fluoropolymer-coated body thus produced can have high mechanical strength even when it has a complicated shape.

The embodiments described hereinbefore are not exclusive and various changes and modifications may be imparted thereto without departing from the scope of the invention. For instance, it is possible to add fillers or pigments to the resins.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. A method for producing a fluoropolymer-coated shaped article comprising:

heating a heat-conductive mold having a thin layer of a fluoropolymer resin thereon to a temperature above the melting point of said resin to form a thin fluoropolymer weld layer on said mold;

treating the external surface of said weld layer to enhance its bondabiity to form-maintaining synthetic resins;

forming a form-maintaining synthetic resin integrally on the treated surface of said fluoropolymer weld layer; and removing said heat-conductive mold.

2. The method of claim 1 wherein the removal of said mold is by dissolving.

3. The method of claim 1 wherein said mold is made of aluminum.

4. The method of claim 1 wherein said thin fluoropolymer weld layer is formed from a polymer selected from the group consisting of tetrafluoroethylene-hexafluoropropylene copolymer, tetrafluoroethylene-perfluoroalkyl vinyl ether copolymer and vinylidene bifluoride polymer.

5. The method of claim 1 wherein said thin fluoropolymer weld layer is polytetrafluoroethylene.

6. A shaped article comprising a synthetic resinous body and a thin fluoropolymer weld layer formed on the surface of said synthetic resinous body, wherein said thin fluoropolymer weld layer is formed from a powder of fluoropolymer.

* * * * *